(12) United States Patent
Edwards et al.

(10) Patent No.: US 6,184,764 B1
(45) Date of Patent: *Feb. 6, 2001

(54) PENDULUM MASS ACCELERATION SENSOR

(75) Inventors: Paul K. Edwards, Norwich; Richard G. Simpson, Burgate, both of (GB)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/401,055

(22) Filed: Sep. 22, 1999

(30) Foreign Application Priority Data

Nov. 18, 1998 (GB) .................................................. 9825142

(51) Int. Cl.[7] ...................................................... H01H 9/00
(52) U.S. Cl. .................................. 335/205; 200/61.45 R
(58) Field of Search ............ 335/205–7; 200/61.45–61.53

(56) References Cited

U.S. PATENT DOCUMENTS

| | | |
|---|---|---|
| 2,872,495 | 2/1959 | Burgess . |
| 3,025,461 | 3/1962 | Snellen . |
| 3,675,169 * | 7/1972 | Scholl ................................. 335/205 |
| 3,731,020 * | 5/1973 | York ................................. 200/61.45 |
| 3,818,393 * | 6/1974 | Morgott ............................. 335/206 |
| 4,016,535 | 4/1977 | Dinlocker . |
| 4,039,790 | 8/1977 | Treckman ......................... 200/61.53 |
| 4,103,842 | 8/1978 | Martin et al. . |
| 4,849,655 | 7/1989 | Bennett ............................... 307/309 |
| 5,010,216 | 4/1991 | Sewell et al. ................. 200/61.45 M |
| 5,059,751 | 10/1991 | Woodman et al. ........... 200/61.45 M |
| 5,194,706 | 3/1993 | Reneau ......................... 200/61.45 R |
| 5,237,134 | 8/1993 | Thuen et al. ................. 200/61.45 M |
| 5,450,049 | 9/1995 | Bachmann ........................... 355/205 |
| 5,664,665 | 9/1997 | Kobayashi et al. .......... 200/61.45 M |
| 6,018,130 * | 1/2000 | Haack et al. ....................... 200/61.52 |

FOREIGN PATENT DOCUMENTS

| | | | |
|---|---|---|---|
| 0566111 | 10/1993 | (EP) . | |
| 2054849 | 2/1981 | (GB) | ............................... A61B/5/16 |
| 2133152 | 7/1984 | (GB) | ............................... G01P/15/00 |
| 2283098 | 4/1995 | (GB) | ............................... G01P/15/02 |
| 2305296 | 4/1997 | (GB) . | |

* cited by examiner

*Primary Examiner*—Lincoln Donovan
(74) *Attorney, Agent, or Firm*—Lonnie Drayer; Patrick Steinnon

(57) ABSTRACT

A bidirectional shock sensor has a housing mounted directly to a printed circuit board. The housing contains a switch or sensor embedded in the housing and is connected by leads to the circuit board. A pendulum sensing mass is suspended from two flexible pendulum arms. The arms come together where they are attached to the housing and constrain the mass to swing along an arc that lies in a plane. A magnet either forms the sensing mass or is mounted to the sensing mass. A reed switch or Giant Magneto-Restrictive (GMR) type sensor is encapsulated within the base of the housing. When a shock causes motion of the sensing mass and the magnet the motion is detected by the sensor or switch.

24 Claims, 3 Drawing Sheets

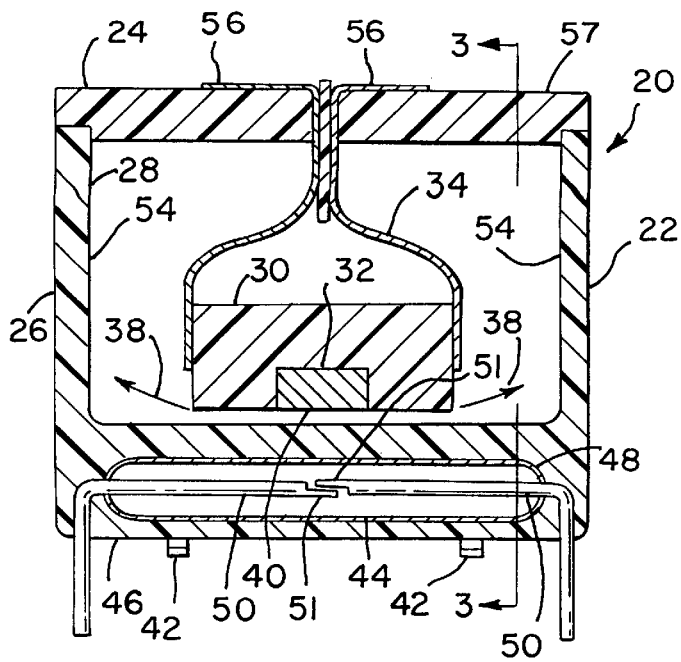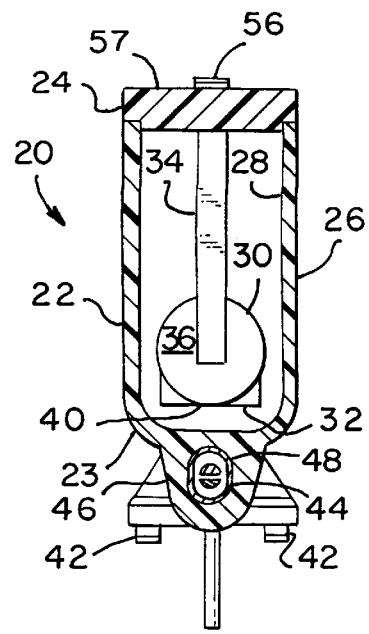
FIG. 2
FIG. 3
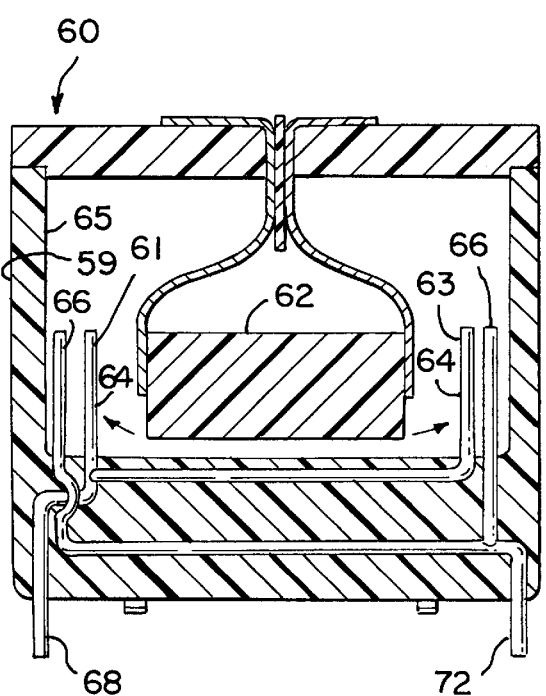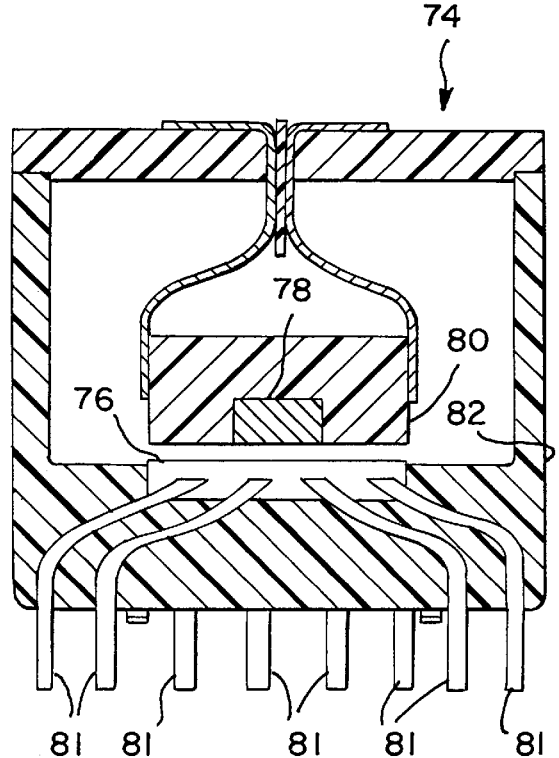
FIG. 4
FIG. 5

PENDULUM MASS ACCELERATION SENSOR

FIELD OF THE INVENTION

The present invention relates to shock sensors used to detect vehicle crashes in general, and to shock sensors employing a pendulum mass in particular.

BACKGROUND OF THE INVENTION

A typical motor vehicle manufactured today has a number of safety systems which function to deploy airbags, and possibly to retract seatbelts. The number of airbags provided in a vehicle continues to increase. Systems now in development deploy multiple airbags to protect vehicle occupants from front, rear, and side impacts, and to position the vehicle occupant's body to withstand acceleration. Deployment of safety systems requires sensors that can detect and characterize a crash as it occurs. Wide use of advanced active safety systems is dependent on producing systems that are sufficiently cost effective that they may be economically employed on a large number of vehicles.

Typically the lowest cost sensors are those formed on an integrated circuit chip using the technology used to form electronic circuitry. This technology is used to fabricate micro devices or accelerometers that can detect accelerations indicative of a vehicle crash. These sensors are particularly cost effective when the sensor can be fabricated together with the deployment logic circuitry using the same technology that is cost effective for large scale integration. However the very small size of these devices makes them sensitive to electromagnetic interference and the like, which can result in false indications of a crash.

Thus an important role remains for macro scale mechanical devices which are less prone to false readings. Such devices are used to verify the occurrence of an actual crash. These macro scale devices employ a sensing mass mounted on a spring or pendulum. Motion of the mass is detected by actuation of a reed switch or a magnetic field sensor of the Hall type.

DISCUSSION OF THE PRIOR ART

A typical reed switch shock sensor is a unidirectional sensor, principally because of the advances made in low cost and small packaging for this type of sensor, see for example U.S. Pat. No. 5,194,706.

Bidirectional sensors exist, for example U.S. Pat. No. 4,103,842, teaches a pendulum-mounted magnet which is positioned over a Hall effect sensor; or U.S. Pat. No. 5,450,049 which teaches a pendulum-mounted sensing mass and magnet positioned over a reed switch for detecting bidirectional acceleration. However, bidirectional or multidirectional shock sensors typically have proven too expensive or too bulky to satisfy the demand for a bidirectional shock sensor with the size and cost achieved by the unidirectional reed switch type sensors.

What is needed is a bidirectional shock sensor having a small package size and the simplicity of design to achieve cost effectiveness.

SUMMARY OF THE INVENTION

The shock sensor of this invention has a housing, which mounts directly to a printed circuit board. The housing contains a switch or sensor embedded in the housing and connected by leads to the circuit board. A pendulum sensing mass is suspended by two flexible pendulum arms, which are constructed of thin strips of spring material. The strips are planar and are arranged in spaced parallel relation where they engage the sensing mass and come together before being rigidly attached to the housing. The strips substantially constrain the mass to swing along an arc, which lies in a single plane. The plane containing the arc along which the mass swings is perpendicular to the planes defined by each pendulum arm. In the preferred embodiment a magnet either forms the sensing mass or is mounted to or within the sensing mass. The switch or sensor is encapsulated within the base of the housing. When a shock or acceleration which has a direction which is at least partially aligned with the arc along which the sensing mass swings is imposed on the housing, the resulting motion of the sensing mass and the magnet forming a part thereof is detected by the sensor or switch.

In the case of a reed switch acting as the sensor, and in which the reeds making up the switch are aligned in the plane in which the sensing mass pivots, the motion of the sensing mass and the magnet mounted thereto will cause the reed switch to change state from open to closed or from closed to open.

One embodiment of the shock sensor may employ a Giant Magneto-restrictive Sensor (GMR) which may be of the digital type, thus providing a switch-like response or the analog type which produces a value corresponding to the displacement of the magnet mounted to the sensing mass.

A further embodiment places a pair of mechanical contacts on either side of the sensing mass so that motion of the sensing mass along the arc through which it swings, causes the mass to engage one pair of mechanical contacts positioned on either side of the mass.

A feature of the present invention is a sensor that provides an indication of acceleration from opposed directions.

It is another feature of the present invention to provide a shock sensor that can provide a signal proportional to the magnitude of acceleration experienced by the shock sensor.

It is a further feature of the present invention to provide a shock sensor that incorporates both a binary switch and a sensor capable of providing a signal proportional to the displacement of a pendulum mass.

Further objects, features and advantages of the invention will be apparent from the following detailed description when taken in conjunction with the accompanying drawings.

BRIEF DESCRIPTION OF THE DRAWINGS

FIG. 2 is a side elevation cross-sectional view of the shock sensor of FIG. 1.

FIG. 3 is a cross-sectional view of the shock sensor of FIG. 2 taken along section line 3—3.

FIG. 4 is a side elevation cross-sectional view of an alternative embodiment of the shock sensor of this invention employing mechanical contacts.

FIG. 5 is a side elevation cross-sectional view of a further embodiment of the shock sensor of this invention employing a GMR sensor.

DETAILED DESCRIPTION OF THE INVENTION

Figure 1:
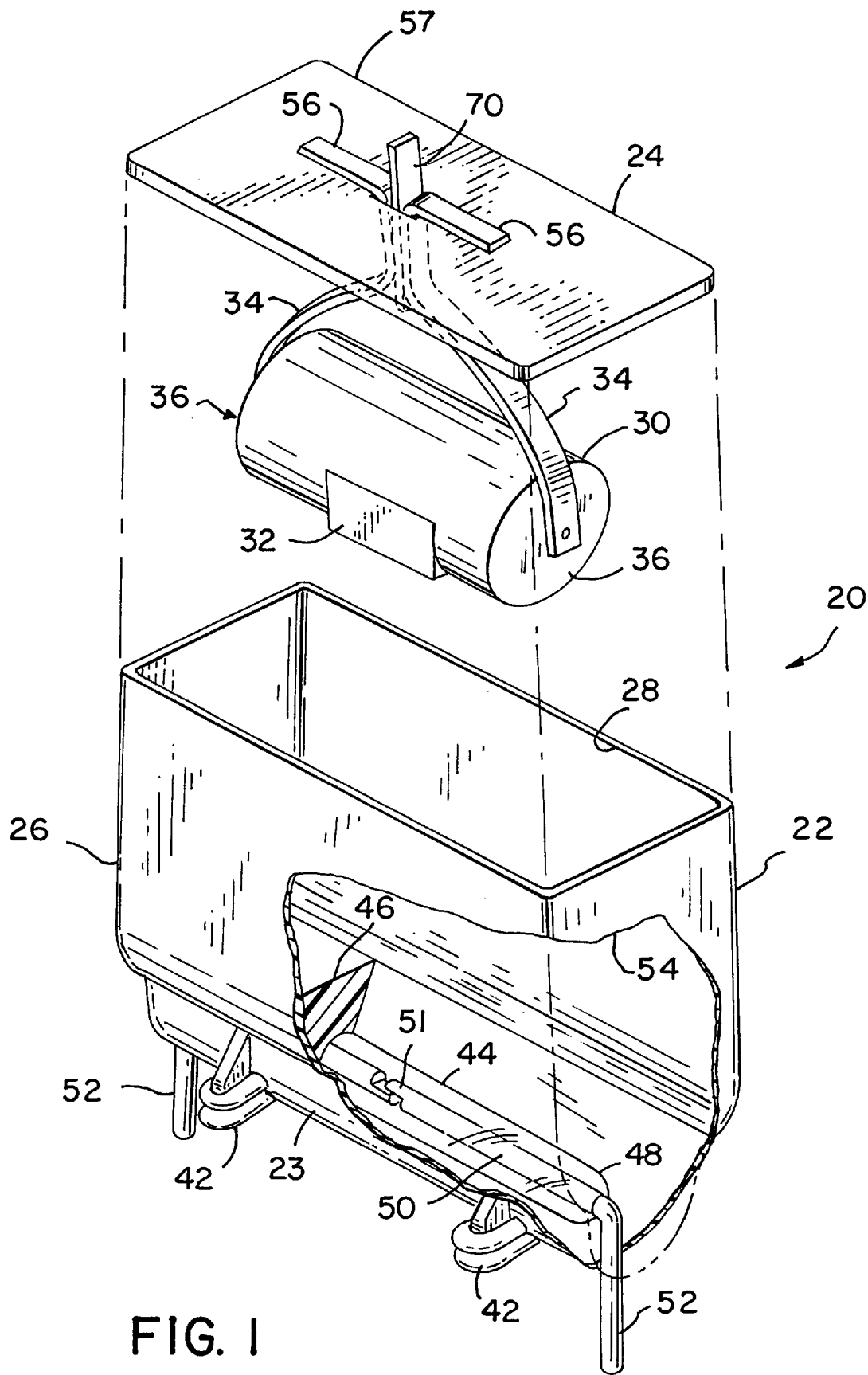
FIG. 1 is an exploded isometric view, partially cut-away in section, of the shock sensor of this invention.

Referring more particularly to FIGS. 1–7 wherein like numbers refer to similar parts, a shock sensor 20 is shown in FIG. 1. The shock sensor has a plastic housing 22 composed of a cover 24 that is affixed to a body 26. A cavity 28 is defined within the housing between the cover and the body. The cover 24 defines an upper portion of the cavity 28, while the body 26 defines a lower portion of the cavity and a base 23 adapted for mounting to a circuit board (not shown). A pendulum mass 30 is supported from the cover 24 within the cavity 28. The pendulum mass incorporates a permanent magnet 32 and is suspended from two planar wires 34, which connect to opposite sides 36 of the pendulum mass. As shown in FIG. 2, the pendulum mass swings along an arc indicated by arrows 38 within the cavity 28. The low point 40 of the arc defines the rest position of the pendulum mass 30 when it is not undergoing acceleration other than gravity. Feet 42 extend from the shock sensor housing 22 beneath the base 23, and are adapted to mount the shock sensor 20 to extend vertically from the horizontal surface of a circuit board (not shown).

A reed switch 44 is positioned within portions 46 of the body 26 of the housing 22 by injection molding the plastic body 26 around the reed switch. The reed switch has a glass capsule 48 and two ferromagnetic reeds 50 that have contacts 51 which overlap in the center of the reed switch. The reeds extend through the ends of the glass capsule to form leads 52. The reed switch 44 is positioned with the contacts 51 beneath the low point 40 of the arc 38. The reed switch 44 represents a normally open reed switch and if the magnet 32 is formed with a single pair of vertically arranged poles, for example North up and South down, as shown in FIG. 2, the reeds 50 will make contact if the magnet 32 swings sufficiently far to either side 54 of the housing 22.

The shock sensor 20 is designed to provide a safing function as part of an automobile safety system that activates various safety devices such as airbags, and seatbelt retractors. The magnitude and direction of a vehicle crash is normally monitored by micro devices formed on an integrated circuit chip. However the size of these devices makes them and associated monitoring electronics subject to electromagnetic interference that can produce a false indication of a crash. A mechanical sensor such as the shock sensor 20 provides a real world mechanical check on whether a crash is taking place. The safety device deployment logic will thus look to the safing sensor as a double check on the physical existence of a crash event before accepting and acting upon the results of electronic sensors. Most existing devices that fulfill this safing function are unidirectional for reasons of cost. The shock sensor 20 provides bidirectional sensing. Typically the sensor would be positioned to detect front and rear impacts of a vehicle, and would return a single state, a closed circuit through the reed switch, in response to either a front impact or a rear impact.

Low cost is achieved in the shock sensor by low part count, small size, and simplicity of manufacture and assembly. The body 26 of the housing 22 may be formed by injection molding performed with the reed switch positioned within the mold. This results in precise positioning of the reed switch 44 with respect to the body 26. The feet 42 are integrally formed with the body 26 and the leads 52 are soldered to the circuit board (not shown) thus providing a simple mounting system. The sensor 20 may be small in size, the illustrated device in FIG. 1 is about 18 mm wide, approximately 15 mm high, and 6 mm wide.

The pendulum mass 30 is held by the two planar wires 34 which are welded or bonded to the sides 36 of the pendulum mass. The planar wires 34 are brought together and pass through the cover 24 and the portions 56 that extend through the cover 24 are bent over and heat staked to the top 57 of the cover. By bringing the wires together, the acceleration force needed to actuate the shock sensor 20 is brought into the range needed to fulfill the safing function.

The pendulum assembly 58 may be cost-effectively fabricated by forming two covers 24 at the same time. The cover tops 57 are formed in a single mold facing each other. Two planar wires are bonded between two pendulum masses. The pendulum masses and the planar wires are inserted into the cover mold, which causes the planar wires to be brought together and to run parallel for a space between the pendulum masses. The covers are formed with the planar wires in place. The wires are cut halfway between the two covers and bent downwardly to the cover top surfaces where they are heat staked in place. A short segment of plastic flashing 70 may be retained between the bent over planar wires 34. The cover with the depending pendulum mass 30 is then ultrasonically welded to the body 26 of the housing 22.

Damping of the pendulum mass 30 is accomplished by interaction between the permanent magnet 32 and the ferromagnetic reeds 50 forming the reed switch 44. If desired, an additional ferromagnetic wire 53 forming a ferromagnetic shunt 49, as shown in the sensor 45 in FIG. 7, may be run over the top and across a reed switch 47 to form two additional leads 55 which extend to the circuit board (not shown). The shunt 49 has the general shape of a staple across the center of the reed switch 47.

This additional ferromagnetic wire 53 would provide additional damping, and a circuit continuity check that can be used to determine whether the sensor 45 is present on the circuit board. The cavity is sealed and damping can be provided by a gas or other fluid within the cavity.

The pendulum mass 30 may be a magnet, thus combining the functions of a sensing mass with the magnet. The pendulum arms formed by the wires 34 will preferably be formed of flexible spring wire such as beryllium copper or stainless steel, approximately 1 to 2 mm wide and 0.75 mm thick. However, round wire could be used with some loss of the tendency of the pendulum to swing in a single plane.

An alternative embodiment shock sensor 60 is shown in FIG. 4. The pendulum mass 62 is mounted to a housing 59 that defines a cavity 65. The pendulum mass moves against a first and second switches 61, 63 formed by upstanding reeds 64 which are pushed against fixed contacts 66. The upstanding reeds are electrically connected to a depending lead 68 that extends from the bottom of the housing 59. Likewise the fixed contacts 66 are electrically connected to a second lead 72 which also extends from the bottom of the housing 59. Thus the shock sensor 60 again forms a bidirectional sensor which provides a single indication that a shock of a selected magnitude has occurred by completing a circuit.

A new class of magnetic field sensors is known as Giant magneto-resistive sensors (GMR). An alternative embodiment shock sensor 74, shown in FIG. 5, has an integrated circuit chip 76, which contains a GMR sensor. The GMR sensor within the chip is positioned below a magnet 78 mounted to a pendulum mass 80.

A GMR type sensor utilizes a discovery made in 1988. The phenomenon discovered is that resistors built up of layers of thin magnetic film a few nanometers thick separated by equally thin nonmagnetic layers have resistance which depends on the strength of a magnetic field applied to the resistor.

A decrease in resistance of between about ten and twenty percent in the built-up resistor is observed when a magnetic field is applied. The physical explanation for the decrease in resistance is the spin dependence of electron scattering and the spin polarization of conduction electrons in ferromagnetic metals. The extremely thin adjacent magnetic layers couple antiferromagnetically to each other so that the magnetic moments of each magnetic layer are aligned nonparallel to adjacent magnetic layers. Electrons, spin polarized in one magnetic layer, are likely to be scattered as they move between adjacent layers. Frequent scattering results in high resistance. An external magnetic field overcomes the antiferromagnetic coupling and produces parallel alignment of moments in adjacent ferromagnetic layers. This decreases scattering and thus device resistance.

Within an integrated circuit package groups of four resistors based on the GMR technology are arranged in a Wheatstone bridge and two legs of the bridge are shielded from the applied magnetic fields. The other two legs are positioned between the magnetic shields. The magnetic shields act as flux concentrators to produce a device of tailored sensitivity to a magnetic flux of a selected intensity. A standard voltage or current is supplied to the solid state device, while a value relating to current or voltage is read out which is proportional to the magnetic field to which the device is exposed. The devices have an axis of sensitivity that is produced by the orientation of the magnetic flux shields. In the sensor contained in the chip 76 this axis is aligned in a direction of swing of the pendulum mass. GMR sensors are available from Nonvolatile Electronics Inc. of 11409 Valley View Rd., Eden Prairie, Minn. (www.nve.com). GMR sensors are small, highly sensitive devices that have exceptional temperature stability, deliver high signal levels, require very little power, and cost less than many competitive devices. All these factors are important in devices used in automobile safety applications.

Two types of GMR sensors are manufactured. The type just described which produces an analog output proportional to the displacement of the magnet 78. This type of output could be used not only for the safing function but also to provide the detailed data with respect to the timing and magnitude of the crash which is used by the deployment logic (not shown) to decide whether an airbag or other safety equipment should be operated.

The second type of GMR is digital in nature, incorporating an electronic circuit which closes a switch based on the presence or absence of a magnetic field of a selected strength. This is very similar to the function provided by a reed switch with the advantage that the so-called "dwell time" which is a function of the difference between the magnetic field strength which causes the switch to close and the field strength which causes the switch to open, can be arbitrarily designed by adjusting the digital values used to clear latching and unlatching of a circuit. A GMR sensor requires a supply voltage, so the minimum number of leads is three for a digital device and four for a analog device. The shock sensor 74 shown in FIG. 5 has a GMR package in an eight pin chip 76. Eight leads 81 extend from the bottom of the housing 82 to a circuit board (not shown) for mounting the shock sensor 74.

Figure 6:
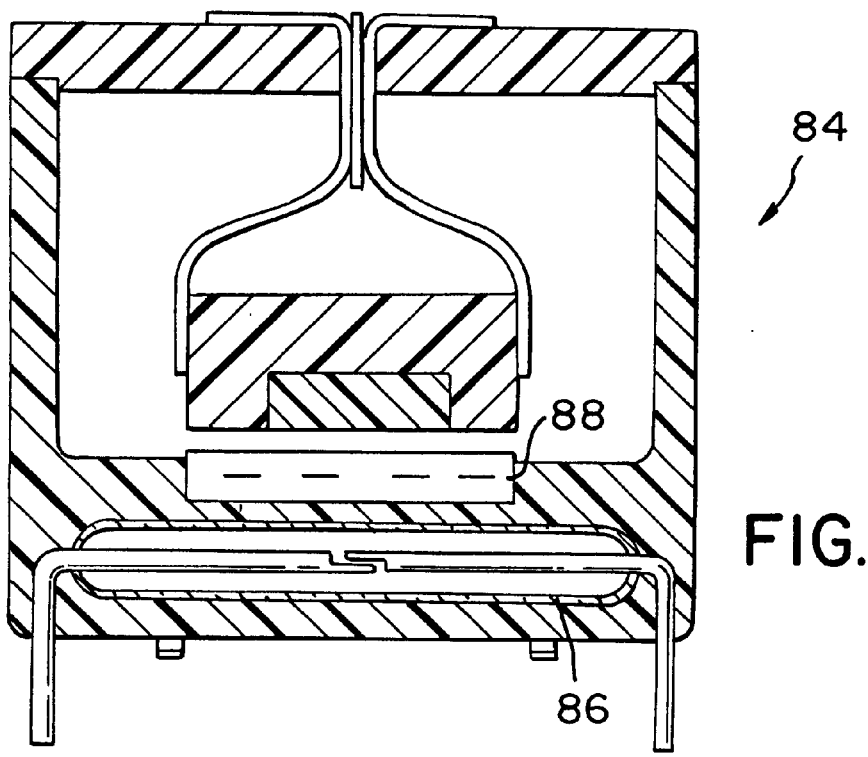
FIG. 6 is a side elevation cross-sectional view of a still further embodiment of the shock sensor of this invention employing both a GMR sensor and a reed switch.
Figure 7:
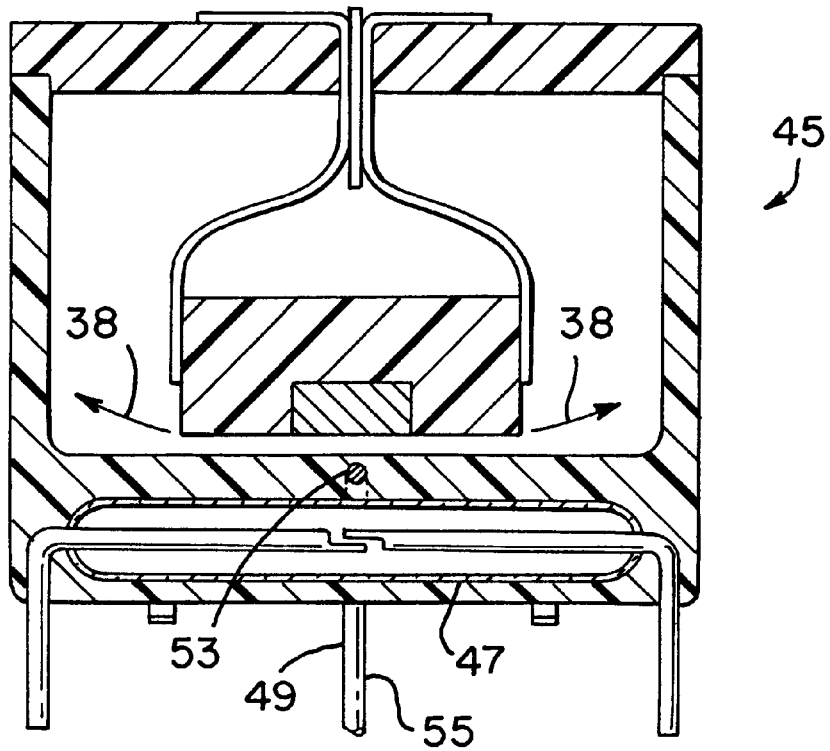
FIG. 7 is a side elevation view of the shock sensor of FIG. 2 including an additional staple shunt.

Another alternative embodiment shock sensor 84, which combines a reed switch 86 and a GMR chip 88, is shown in FIG. 6. Such a sensor combines the safing function provided by the reed switch 86 with a characterizing function, which is provided by the GMR sensor 88. The characterizing function is a necessary input to the deployment logic (not shown) and is used by the deployment logic to analyze the nature and timing of the shock.

Other combinations of sensors are possible, for example combining the mechanical switch illustrated in FIG. 4 with a GMR sensor, or combining two GMR sensors: one which provides a digital result for safing, and one which provides a displacement value as a deployment logic input.

It is understood that the invention is not limited to the particular construction and arrangement of parts herein illustrated and described, but embraces such modified forms thereof as come within the scope of the following claims.

What is claimed is:

1. A bidirectional shock sensor comprising:

a housing having a base for mounting to a circuit board, portions of the housing forming a pendulum cavity, the cavity having an upper portion and a lower portion;

a pendulum mass supported from the cavity upper portion by two flexible wire pendulum arms rigidly mounted to the housing, the pendulum arms being in spaced relation where they connect to the pendulum mass, wherein the pendulum arms define a plane, and the pendulum mass swings along an arc within the plane and within the cavity, the arc defined by the swing of the pendulum mass having a lowest point and defining a first direction and a second direction opposite the first direction; and a means for detecting motion of the pendulum mass along said arc.

2. The bidirectional shock sensor of claim 1 wherein the two pendulum arms are formed of flexible planar wires which have their greatest width perpendicular to the plane along which the pendulum mass swings.

3. The bidirectional shock sensor of claim 1 wherein the means for detecting motion of the pendulum mass comprises:

a first switch positioned within the cavity and spaced from the lowest point so that motion of the mass in the first direction engages the first switch causing it to change states; and a second switch positioned within the cavity and spaced so that motion of the mass in the second direction engages the second switch causing it to change states.

4. The bidirectional shock sensor of claim 1 wherein the pendulum mass incorporates a means for generating a permanent magnetic field, and wherein the means for detecting motion of the pendulum mass is a reed switch positioned below the lowest point of the pendulum mass arc.

5. The bidirectional shock sensor of claim 1 wherein the pendulum mass incorporates a means for generating a permanent magnetic field, and wherein the means for detecting motion includes a Giant Magneto-restrictive Sensor mounted to the housing below the pendulum mass.

6. The bidirectional shock sensor of claim 4 wherein the means for detecting motion of the pendulum also includes a Giant Magneto-restrictive Sensor positioned above the reed switch and below the pendulum mass.

7. The bidirectional shock sensor of claim 4 further comprising a ferromagnetic shunt positioned below the pendulum mass to provide magnetic damping.

8. The bidirectional shock sensor of claim 5 further incorporating a ferromagnetic shunt positioned below the pendulum mass to provide magnetic damping.

9. The bidirectional shock sensor of claim 6 further incorporating a ferromagnetic shunt positioned below the pendulum mass to provide magnetic damping.

10. The bidirectional shock sensor of claim 1 wherein the two flexible wire pendulum arms are brought together above the pendulum mass where the two flexible wire pendulum arms are rigidly mounted to the housing.

11. The bidirectional shock sensor of claim 1 including a plurality of leads extending from the base of the housing, and wherein the means for detecting motion of the pendulum mass is connected to said leads.

12. The bidirectional shock sensor of claim 2 including a plurality of leads extending from the base of the housing, and wherein the means for detecting motion of the pendulum mass is connected to said leads.

13. The bidirectional shock sensor of claim 3 including a plurality of leads extending from the base of the housing, and wherein the means for detecting motion of the pendulum mass is connected to said leads.

14. The bidirectional shock sensor of claim 4 including a plurality of leads extending from the base of the housing, and wherein the means for detecting motion of the pendulum mass is connected to said leads.

15. The bidirectional shock sensor of claim 5 including a plurality of leads extending from the base of the housing, and wherein the means for detecting motion of the pendulum mass is connected to said leads.

16. The bidirectional shock sensor of claim 6 including a plurality of leads extending from the bottom of the housing, and wherein the means for detecting motion of the pendulum mass is connected to said leads.

17. The bidirectional shock sensor of claim 1 wherein the housing is constructed of a lower body which contains the means for detecting motion of the pendulum, and a cover which is sealed to the housing, the two flexible planar pendulum arms being rigidly mounted to the cover.

18. The bidirectional shock sensor of claim 4 wherein the means for detecting motion of the pendulum mass is encapsulated within material forming the housing.

19. The bidirectional shock sensor of claim 5 wherein the means for detecting motion of the pendulum mass is encapsulated within material forming the housing.

20. The bidirectional shock sensor of claim 6 wherein the means for detecting motion of the pendulum mass is encapsulated within material forming the housing.

21. A bidirectional shock sensor comprising:

a housing, portions of the housing forming a pendulum cavity, the cavity having an upper portion and a lower portion;

a pendulum mass supported from the cavity upper portion by two flexible wire pendulum arms which are brought together and fixed to the housing, the pendulum arms being in spaced relation where they connect to the pendulum mass, so that the pendulum mass may swing along an arc within the cavity, the arc defined by the swing of the pendulum mass having a lowest point and defining a first direction and a second direction opposite the first direction; and a switch or sensor positioned below the pendulum mass, and responsive to displacement of the pendulum mass along said arc.

22. The bidirectional shock sensor of claim 21 wherein the switch comprises:

a first switch positioned within the cavity and spaced from the lowest point so that motion of the pendulum mass in the first direction engages the first switch causing it to change states; and a second switch positioned within the cavity and spaced so that motion of the mass in the second direction engages the second switch causing it to change states.

23. The bidirectional shock sensor of claim 21 wherein the switch is a reed switch positioned below the lowest point of the pendulum mass arc, and wherein the pendulum mass incorporates a permanent magnet.

24. The bidirectional shock sensor of claim 21 wherein the pendulum mass incorporates a permanent magnet, and wherein the switch or sensor comprises a Giant Magnetorestrictive Sensor mounted to the housing below the pendulum mass.

* * * * *